US012804781B2

(12) United States Patent
Hosokawa et al.

(10) Patent No.: US 12,804,781 B2
(45) Date of Patent: Nov. 17, 2026

(54) HIGH FREQUENCY HEATING APPARATUS

(71) Applicant: Panasonic Intellectual Property Management Co., Ltd., Osaka (JP)

(72) Inventors: Chikako Hosokawa, Shiga (JP); Daisuke Hosokawa, Shiga (JP); Mikio Fukui, Shiga (JP); Takashi Uno, Shiga (JP); Shinji Takano, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 621 days.

(21) Appl. No.: 18/260,317

(22) PCT Filed: Feb. 4, 2022

(86) PCT No.: PCT/JP2022/004531
§ 371 (c)(1),
(2) Date: Jul. 3, 2023

(87) PCT Pub. No.: WO2022/176655
PCT Pub. Date: Aug. 25, 2022

(65) Prior Publication Data
US 2024/0196486 A1 Jun. 13, 2024

(30) Foreign Application Priority Data
Feb. 18, 2021 (JP) ................................ 2021-023861

(51) Int. Cl.
*H05B 6/50* (2006.01)
*G01B 11/06* (2006.01)

(52) U.S. Cl.
CPC ............... *H05B 6/50* (2013.01); *G01B 11/06* (2013.01)

(58) Field of Classification Search
CPC ............. H05B 6/50; H05B 6/54; G01B 11/06
See application file for complete search history.

(56) References Cited

U.S. PATENT DOCUMENTS

2008/0105672 A1* 5/2008 Yamamoto ............... A23B 2/82 219/703
2010/0326982 A1* 12/2010 Yamada .................. H05B 3/03 219/538
(Continued)

FOREIGN PATENT DOCUMENTS

JP 4630189 B 2/2011
JP 2017-182885 10/2017
(Continued)

OTHER PUBLICATIONS

JP20171828 85A—translation (Year: 2025).*
(Continued)

*Primary Examiner* — Justin C Dodson
*Assistant Examiner* — Keith Brian Assante
(74) *Attorney, Agent, or Firm* — Wenderoth, Lind & Ponack, L.L.P.

(57) ABSTRACT

A high-frequency heating device according to the present disclosure includes a heating chamber, first electrode, second electrode, high-frequency power supply, and controller. The first electrode is an electrode disposed inside the heating chamber. The second electrode is an electrode disposed inside the heating chamber and faces the first electrode. The high-frequency power supply generates high-frequency electric power. The controller controls the high-frequency power supply. The controller controls heating of a heating target placed between the first and second electrodes by causing the high-frequency power supply to apply the high-frequency electric power between the first and second electrodes. The controller causes the high-frequency power supply to selectively perform the heating in a normal mode for heating the whole of the object and the heating in a protection mode for heating the object with prevention of local overheating of the object.

14 Claims, 10 Drawing Sheets

(56) References Cited

U.S. PATENT DOCUMENTS

| | | | | |
|---|---|---|---|---|
| 2016/0021708 | A1* | 1/2016 | Teramoto | H05B 6/062 219/626 |
| 2021/0014942 | A1* | 1/2021 | Hirai | H05B 6/48 |
| 2021/0267025 | A1* | 8/2021 | Uno | H05B 6/62 |
| 2022/0022292 | A1* | 1/2022 | Uno | H05B 6/68 |
| 2022/0132631 | A1* | 4/2022 | Hosokawa | A23B 2/001 |
| 2022/0252339 | A1* | 8/2022 | Mori | A23B 2/80 |

FOREIGN PATENT DOCUMENTS

| | | | | |
|---|---|---|---|---|
| JP | 2017182885 A | * 10/2017 | | H05B 6/62 |
| JP | 2019-075322 | 5/2019 | | |

OTHER PUBLICATIONS

International Search Report of PCT application No. PCT/JP2022/004531 dated Apr. 5, 2022.
Chinese Search Report dated Jun. 18, 2026 in corresponding Chinese Patent Application No. 202280012601.7, 2 pages.

* cited by examiner

FIG. 5

| Heating course | A | B | C | D |
|---|---|---|---|---|
| Heating mode | Normal mode | Protection mode | Normal mode | Protection mode |
| Dimensions and type of heating target | 200mm×100mm×100mm frozen meat | | 150mm×50mm×30mm frozen raw-fish fillet | |
| Temperature of heating target at start of heating | -20°C | -20°C | -20°C | -60° |
| Dimensions of first electrode used | 300mm ×200mm | 150mm ×200mm | 300mm ×200mm | 100mm ×200mm |
| Dimensions of second electrode | 300mm ×200mm | 300mm ×200mm | 300mm ×200mm | 300mm ×200mm |
| Heating power output | 500W | 250W | 1000W | 300W |
| Heating time | 10 min | 20 min | 5 min | 20 min |
| Distance between electrodes | 140mm | 160mm | 50mm | 90mm |
| Thickness of heating tray (recommended) | 20mm | 20mm | 10mm | 30mm |
| Distance between first electrode and heating target | 20mm | 40mm | 10mm | 30mm |
| Distance between second electrode and heating target | 20mm | 20mm | 10mm | 30mm |

(a)

| | | | | |
|---|---|---|---|---|
| 15.2 | 4.5 | 1.2 | 7.9 | 21.3 |
| -1.5 | -2.1 | -2.9 | -2.0 | -1.8 |
| 17.1 | 3.1 | 0.4 | 6.2 | 19.4 |

(b)

| | | | | |
|---|---|---|---|---|
| -0.5 | 0.8 | 1.5 | 1.2 | -1.0 |
| -0.7 | -0.1 | -0.8 | 0.7 | -0.8 |
| -0.6 | 1.1 | -0.2 | 3.0 | -1.1 |

(c)

| | | | | |
|---|---|---|---|---|
| 3.2 | 2.8 | -1.2 | -1.4 | 6.7 |
| 1.9 | -1.8 | -1.9 | -1.5 | 0.8 |
| 5.3 | -0.1 | -1.6 | -0.5 | 6.4 |

(d)

| | | | | |
|---|---|---|---|---|
| -2.7 | 0.9 | -1.2 | -0.7 | -2.4 |
| -2.9 | -1.6 | -2.0 | -1.8 | -2.8 |
| -2.6 | 1.0 | -0.6 | -1.3 | -2.1 |

(e)

| | | | | |
|---|---|---|---|---|
| 28.3 | 18.1 | 6.3 | 12.1 | 32.6 |
| 8.4 | -4.2 | -5.2 | -3.9 | 7.8 |
| 33.7 | 21.1 | 12.6 | 19.0 | 29.9 |

FIG. 12

| Temperature of heating target | Not lower than −20°C | | | Lower than -20°C | |
|---|---|---|---|---|---|
| Height of heating target | Smaller than 30 mm | Not smaller than 30 mm smaller than 60 mm | Not smaller than 60 mm | Smaller than 20 mm | Not smaller than 20 mm |
| Heating mode | Normal mode | Protection mode | Protection mode | Normal mode | Protection mode |
| Distance between first electrode and heating target | 20mm | 30mm | 40mm | 30mm | 50mm |
| Split electrodes used/ dimensions of heating region | All split electrodes 300×200mm | Split electrodes 14J, 14K 100×50mm | Split electrodes 14J, 14K 100×50mm | All split electrodes 300×200mm | Split electrodes 14J, 14K 100×50mm |
| Dimensions of second electrode | 300×200mm | | | | |
| Heating power output | 1000W | 500W | 250W | 500W | 250W |
| Heating time | 5 min | 10 min | 20 min | 20 min | 40 min |

HIGH FREQUENCY HEATING APPARATUS

TECHNICAL FIELD

The present disclosure relates to high-frequency heating devices.

BACKGROUND ART

Conventionally, high-frequency heating devices have been known each of which heats a heating target by supplying high-frequency electric power to its electrodes with the object being placed between the electrodes facing each other (for example, Patent Literature 1).

The high-frequency heating device described in Patent Literature 1 is such that it supplies high-frequency electric power to electrodes having a plate-like shape smaller in size than a heating target and, subsequently, supplies high-frequency electric power to other electrodes having a plate-like shape larger in size than the preceding electrodes. The conventional high-frequency heating device described above is intended to heat the heating target uniformly by preventing the high-frequency energy from concentrating on edge portions of the object.

CITATION LIST

Patent Literature

PTL 1: Japanese Patent No. 4630189

SUMMARY OF THE INVENTION

However, with the conventional high-frequency heating device described above, the electrodes used are required to be replaced by other electrodes having a size depending on the size of a heating target. For this reason, in cases where a plurality of types of heating targets are sequentially heated in a short period, such a configuration takes longer time to replace the electrodes.

The purpose of the present disclosure is to provide a high-frequency heating device capable of heating, with a simpler configuration, a plurality of types of heating targets having different sizes.

The high-frequency heating device according to the present disclosure includes a heating chamber, first electrode, second electrode, high-frequency power supply, and controller.

The first electrode is an electrode disposed inside the heating chamber. The second electrode is an electrode disposed inside the heating chamber, with facing the first electrode. The high-frequency power supply generates high-frequency electric power. The controller controls the high-frequency power supply.

The controller controls heating of a heating target placed between the first electrode and the second electrode by causing the high-frequency power supply to apply the high-frequency electric power between the first electrode and the second electrode. The controller causes the high-frequency power supply to selectively perform the heating in a normal mode and the heating in a protection mode, the normal mode being for heating the whole of the heating target, the protection mode being for heating the heating target with prevention of local overheating of the heating target.

The high-frequency heating device according to the present disclosure can heat, with a simple configuration, a heating target.

BRIEF DESCRIPTION OF DRAWINGS

FIG. 5 is a table of heating courses selectable in the first exemplary embodiment and operations in each heating course of the high-frequency heating device.

FIG. 12 is a table of heating courses selectable in the second embodiment and operations in each heating course of the high-frequency heating device.

DESCRIPTION OF EMBODIMENTS

Figure 1:
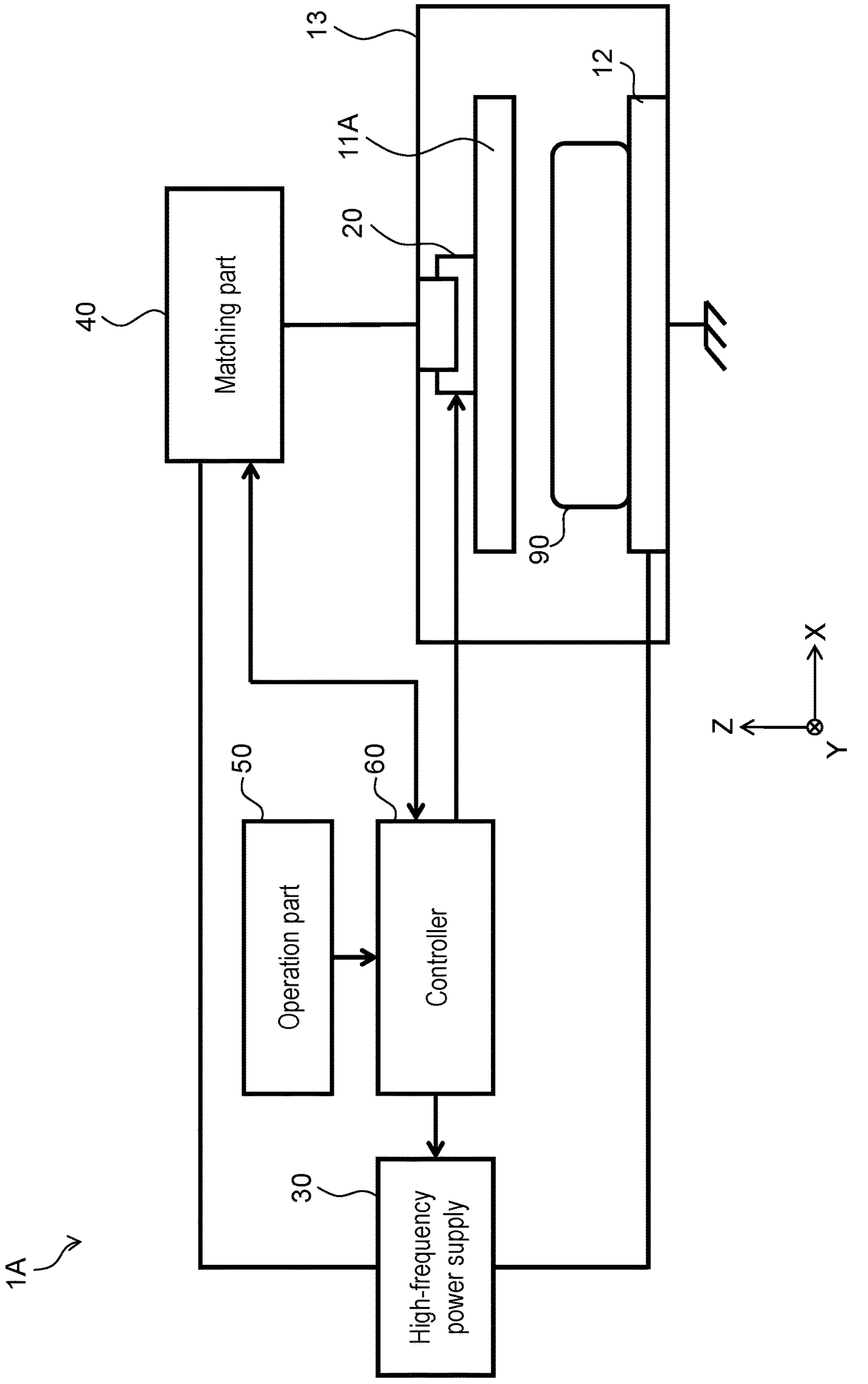
FIG. 1 is a schematic diagram illustrating a configuration of a high-frequency heating device according to a first exemplary embodiment of the present disclosure.

A first aspect of the present disclosure is a high-frequency heating device including a heating chamber, first electrode, second electrode, high-frequency power supply, and controller.

The first electrode is an electrode disposed inside the heating chamber. The second electrode is an electrode disposed inside the heating chamber, with facing the first electrode. The high-frequency power supply generates high-frequency electric power. The controller controls the high-frequency power supply.

The controller controls heating of a heating target placed between the first electrode and the second electrode by causing the high-frequency power supply to apply the high-frequency electric power between the first electrode and the second electrode. The controller causes the high-frequency power supply to selectively perform the heating in a normal mode and the heating in a protection mode, the normal mode being for heating the whole of the heating target, the protection mode being for heating the heating target with prevention of local overheating of the heating target.

According to the aspect, the protection mode allows uniform heating of the heating target by preventing overheating of the heating target. The normal mode allows more rapid heating of the whole of the heating target than the protection mode.

The protection mode is effective in cases such as where the height of the heating target is higher than a predetermined value and where the initial temperature of the heating target is lower than a predetermined value. The normal mode is effective in cases such as where the height of the heating target is lower than the predetermined value.

In the high-frequency heating device according to a second aspect of the present disclosure, in addition to the first aspect, the first electrode includes a plurality of split electrodes. In the protection mode, the controller causes the high-frequency power supply to supply the high-frequency electric power to split electrodes, of the plurality of split electrodes, facing part of the heating target. The controller does not cause the high-frequency power supply to supply the high-frequency electric power to split electrodes, of the plurality of split electrodes, facing other part of the heating target.

According to the aspect, it is possible to prevent local overheating of the heating target, allowing uniform heating of the heating target.

In the high-frequency heating device according to a third aspect of the present disclosure, in addition to the second aspect, the controller, in the protection mode, causes the high-frequency power supply to supply the high-frequency electric power to the split electrodes facing the part of the heating target. On the other hand, the controller does not cause the high-frequency power supply to supply the high-frequency electric power to the split electrodes facing the other part of the heating target.

Subsequently, the controller does not cause the high-frequency power supply to supply the high-frequency electric power to the split electrodes facing the part of the heating target. On the other hand, the controller causes the high-frequency power supply to supply the high-frequency electric power to the split electrodes facing the other part of the heating target.

According to the aspect, by changing which split electrodes are supplied with the high-frequency electric power, it is possible to switch between the protection mode and the normal mode. That is, the switching between the protection mode and the normal mode can be easily performed without, such as, replacing the electrodes.

The high-frequency heating device according to a fourth aspect of the present disclosure further includes, in addition to those in the first aspect, a position adjusting part to adjust the distance between the first electrode and the second electrode. According to the aspect, in the protection mode and the normal mode, it is possible to set distances between the heating target and the electrodes equal to respective optimal values.

In the high-frequency heating device according to a fifth aspect of the present disclosure, in addition to the fourth aspect, the position adjusting part causes, in the protection mode, the first electrode to be farther away from the heating target than the first electrode is in the normal mode. According to the aspect, it is possible to avoid local overheating of the heating target, allowing uniform heating of the whole of the heating target.

In the high-frequency heating device according to a sixth aspect of the present disclosure, in addition to the first aspect, the controller causes, in the protection mode, the high-frequency power supply to generate the high-frequency electric power smaller in heating power output per unit time than the high-frequency electric power generated in the normal mode. According to the aspect, it is possible to prevent overheating of the heating target in the protection mode.

For a heating target having initial temperatures lower than a certain degree of temperature or a heating target with a height larger than a certain degree of height, local overheating tends to occur. In the protection mode, for such a heating target, the heating power output is preferably reduced relative to that in the normal mode.

The high-frequency heating device according to a seventh aspect of the present disclosure further includes, in addition to those in the first aspect, a camera disposed inside the heating chamber to take an image of the heating target. The controller detects the dimension of the heating target from the image of the heating target, the image being taken by the camera. According to the aspect, in accordance with the dimension of the heating target, the controller can set an electrode's region to be supplied with the high-frequency electric power.

The high-frequency heating device according to an eighth aspect of the present disclosure further includes, in addition to those in the first aspect, a temperature detecting part to detect the temperature of the heating target.

According to the aspect, in the case of the heating target being a frozen product, the controller can detect the temperature and rough dimension of the heating target. When the temperature detecting part detects a local temperature rise of the heating target, the controller can cause the high-frequency power supply either to halt the output of the high-frequency electric power or to reduce the power level of the high-frequency electric power. As a result, it is possible to prevent local overheating of the heating target.

The high-frequency heating device according to a ninth aspect of the present disclosure further includes, in addition to those in the first aspect, an operation part to input a selection, by a user, of either the normal mode or a selection of the protection mode and a selection of the protection mode by the user. According to the aspect, in accordance with the user's own judgement, the user can cause the high-frequency heating device to perform either the protection mode or the normal mode.

Hereinafter, embodiments of the present disclosure will be described with reference to the accompanying drawings. The X-, Y-, and Z-axes illustrated in the drawings indicate the width direction (left-and-right direction), depth direction (fore-and-aft direction), and height direction (vertical direction) of a high-frequency heating device, respectively. That is, the right side of the high-frequency heating device is the positive direction of the X-axis, the rear side of the high-frequency heating device is the positive direction of the Y-axis, and the vertically above side of the high-frequency heating device is the positive direction of the Z-axis.

First Exemplary Embodiment

High-frequency heating device 1A according to a first exemplary embodiment of the present disclosure will be described. FIG. 1 is a schematic block diagram illustrating a configuration of high-frequency heating device 1A according to the first exemplary embodiment.

As shown in FIG. 1, high-frequency heating device 1A includes first electrode 11A, second electrode 12, position adjusting part 20, high-frequency power supply 30, matching part 40, operation part 50, and controller 60.

First electrode 11A and second electrode 12 are plate-like electrodes that are disposed inside heating chamber 13 and parallel to the XY plane. First electrode 11A is disposed above second electrode 12, facing second electrode 12. Therefore, placing heating target 90 on second electrode 12 results in the arrangement of heating target 90 between first electrode 11A and second electrode 12.

Controller 60 controls high-frequency power supply 30. High-frequency power supply 30 is coupled to first electrode 11A via matching part 40, and coupled directly to second electrode 12.

High-frequency power supply 30 generates high-frequency electric power and applies the generated power between first electrode 11A and second electrode 12. This produces an electric field between first electrode 11A and second electrode 12. This electric field dielectrically hates heating target 90 arranged between first electrode 11A and second electrode 12. Heating target 90 is a dielectric, for example, a food material. In this way, high-frequency heating device 1A performs heating or thawing processing of heating target 90.

Note that, in the first embodiment, high-frequency power supply 30 supplies high-frequency electric power to both first electrode 11A and second electrode 12. Alternatively, second electrode 12 may be grounded in which case high-frequency power supply 30 supplies the high-frequency electric power only to first electrode 11A. On the contrary, first electrode 11A may be grounded in which case high-frequency power supply 30 supplies the high-frequency electric power only to second electrode 12.

That is, high-frequency power supply 30 may supply the high-frequency electric power to any one or both of first electrode 11A and second electrode 12.

Figure 2:
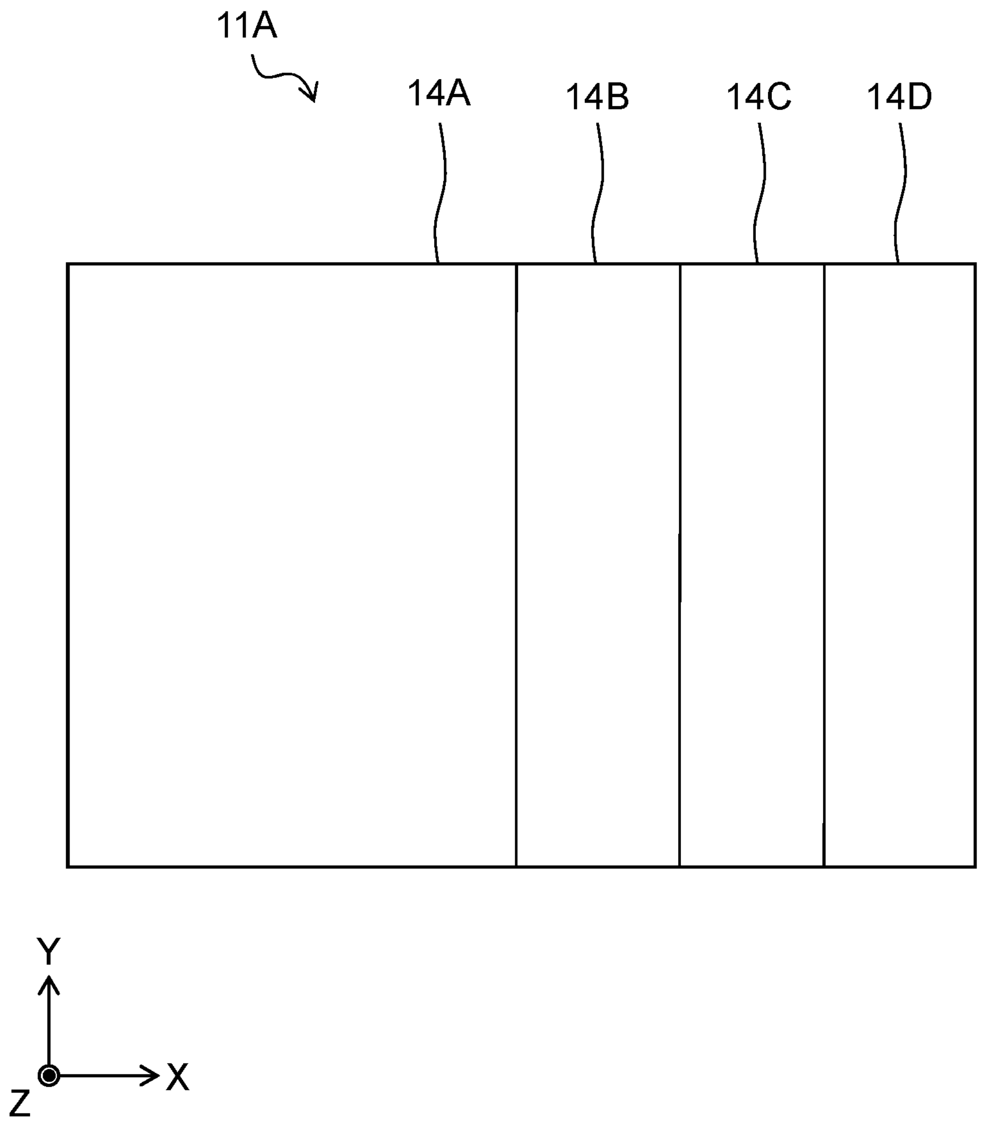
FIG. 2 is a schematic plan view of a first electrode according to the first exemplary embodiment.

FIG. 2 is a schematic view of a configuration of first electrode 11A in a plan view, i.e., when viewed downward from above along the Z-axis. As shown in FIG. 2, first electrode 11A includes split electrode 14A, split electrode 14B, split electrode 14C, and split electrode 14D.

Split electrodes 14A to 14D are flat-plate electrodes each formed in a rectangular shape, and are disposed in order from the left side. Controller 60 can cause high-frequency power supply 30 to separately supply high-frequency electric power to each of split electrodes 14A to 14D.

In the first embodiment, among split electrodes 14A to 14D, split electrode 14A has the largest area and split electrodes 14B to 14D each have a nearly equal area. Split electrodes 14B to 14D are made movable along the Z-axis by position adjusting part 20.

The shapes of split electrodes 14A to 14D are not limited to rectangular ones. Split electrodes 14A to 14D may each have a square shape, a round shape including an elliptical one, or a polygonal shape other than a quadrilateral one.

Second electrode 12 is a flat-plate electrode formed in a rectangular shape. Second electrode 12 is disposed to face first electrode 11A. In the first embodiment, second electrode 12 is disposed inside heating chamber 13 and below first electrode 11A. Second electrode 12 is not limited to a single electrode. Like first electrode 11A, second electrode 12 may be composed of a plurality of electrodes and may each have a square shape, a round shape including elliptical one, or a pentagonal-or-more polygonal shape. The position of first electrode 11A and the position of second electrode 12 may be interchanged.

In the first embodiment, position adjusting part 20 causes first electrode 11A to move upward or downward, thereby adjusting the height position of first electrode 11A. This allows adjustment of the distance between first electrode 11A and second electrode 12. However, position adjusting part 20 may cause second electrode 12 rather than first electrode 11A to move upward or downward or, alternatively, may cause both of first electrode 11A and second electrode 12 to move upward or downward.

Position adjusting part 20 includes, for example, a motor and a connection member that connects the motor to first electrode 11A. The motor is disposed at the ceiling of heating chamber 13. Rotation of the motor causes the connection member to move upward or downward, thereby moving first electrode 11A upward or downward. The connection member may be, for example, a rodlike member or a wire. Controller 60 controls position adjusting part 20.

Note that position adjusting part 20 may be configured to cause any one or both of first electrode 11A and second electrode 12 to move.

Figure 6:
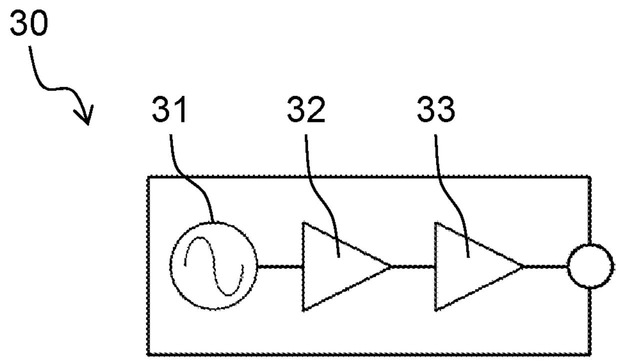
FIG. 6 is a schematic diagram illustrating a configuration of a high-frequency power supply according to the first exemplary embodiment.

FIG. 6 is a schematic diagram illustrating a configuration of high-frequency power supply 30. As shown in FIG. 6, high-frequency power supply 30 includes high-frequency oscillator 31, amplifier 32, and amplifier 33.

High-frequency oscillator 31 oscillates a high-frequency signal with any frequency in the HF to VHF band and outputs the signal. Amplifier 32 and amplifier 33 amplify the high-frequency signal fed from high-frequency oscillator 31 to any electric power level. In this way, high-frequency power supply 30 can output high-frequency electric power with a desired frequency and electric power level.

Matching part 40 is coupled between first electrode 11A and high-frequency power supply 30. Matching part 40 matches the impedance of high-frequency power supply 30 to the impedance inside heating chamber 13 that includes first electrode 11A, second electrode 12, and heating target 90.

Figure 7:
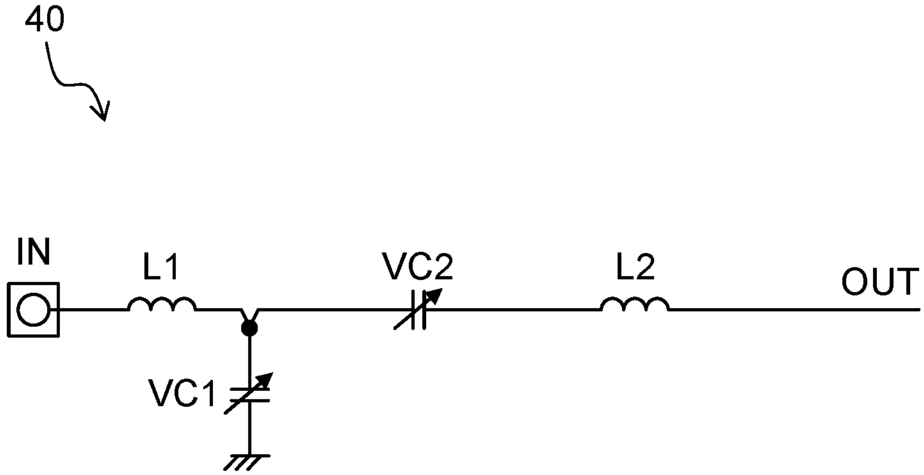
FIG. 7 is a schematic diagram of a configuration of a matching part according to the first exemplary embodiment.

FIG. 7 is a schematic diagram illustrating a configuration of matching part 40. As shown in FIG. 7, matching part 40 includes coil L1, coil L2, variable capacitor VC1, and variable capacitor VC2. In matching part 40, coil L1, coil L2, and variable capacitor VC2 are disposed in series, and variable capacitor VC1 is disposed in parallel with other elements.

Controller 60 causes the capacitances of variable capacitor VC1 and variable capacitor VC2 to change. In accordance with this, matching part 40 performs the impedance matching.

The configuration of matching part 40 is illustrated in FIG. 7 as an example, and is not limited to this. Moreover, in the present disclosure, matching part 40 is not an essential constituent.

Controller 60 is electrically coupled to position adjusting part 20, high-frequency power supply 30, and operation part 50. Controller 60 controls position adjusting part 20 and high-frequency power supply 30 in accordance with information input by a user via operation part 50.

Specifically, the information from the user includes dimensions of heating target 90 and a heating mode. In accordance with the information, controller 60 instructs position adjusting part 20 on the direction and amount of moving of first electrode 11A, and instructs high-frequency power supply 30 on the frequency and electric power level of the high-frequency electric power. Controller 60 adjusts the height position of first electrode 11A and the high-frequency electric power supplied to both first electrode 11A and second electrode 12, thereby allowing heating target 90 to be uniformly heated.

With high-frequency heating device 1A configured as described above, its operations and actions in a protection mode and a normal mode will be described.

Figure 3:
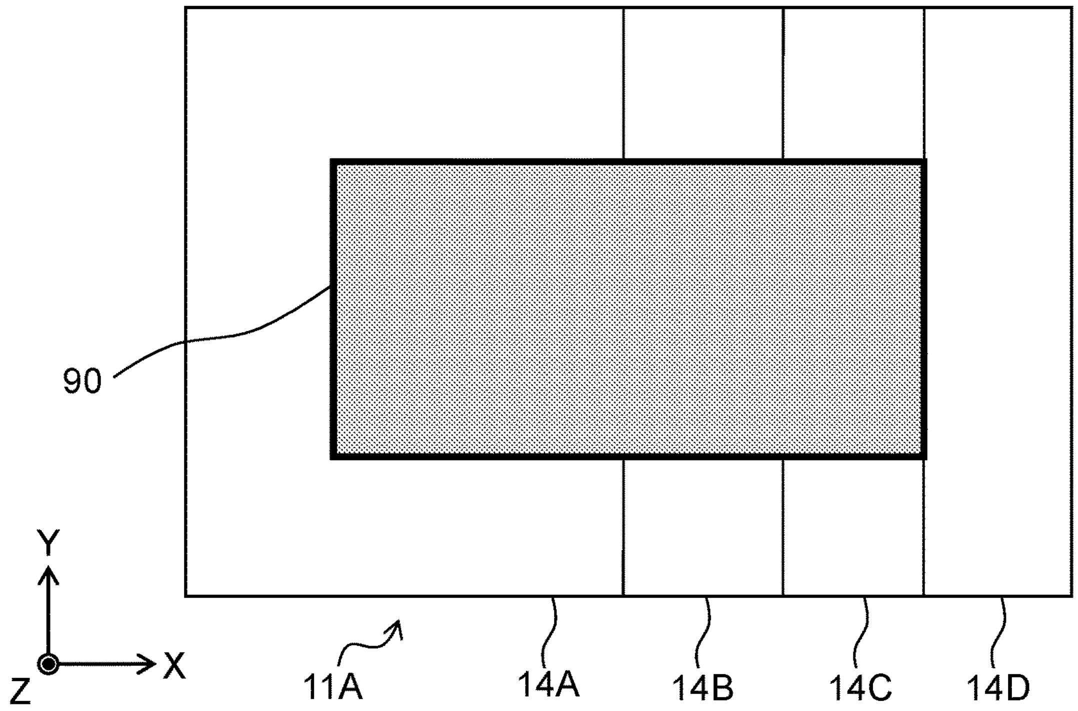
FIG. 3 is a schematic plan view illustrating the position of a heating target over the first electrode according to the first exemplary embodiment.

FIG. 3 is a schematic plan view illustrating a positional relation of heating target 90 and first electrode 11A when viewed downward from above along the Z-axis, in the case where a frozen meat block is heated in heating course A. Heating course A is one of the heating courses in the normal mode.

Figure 4:
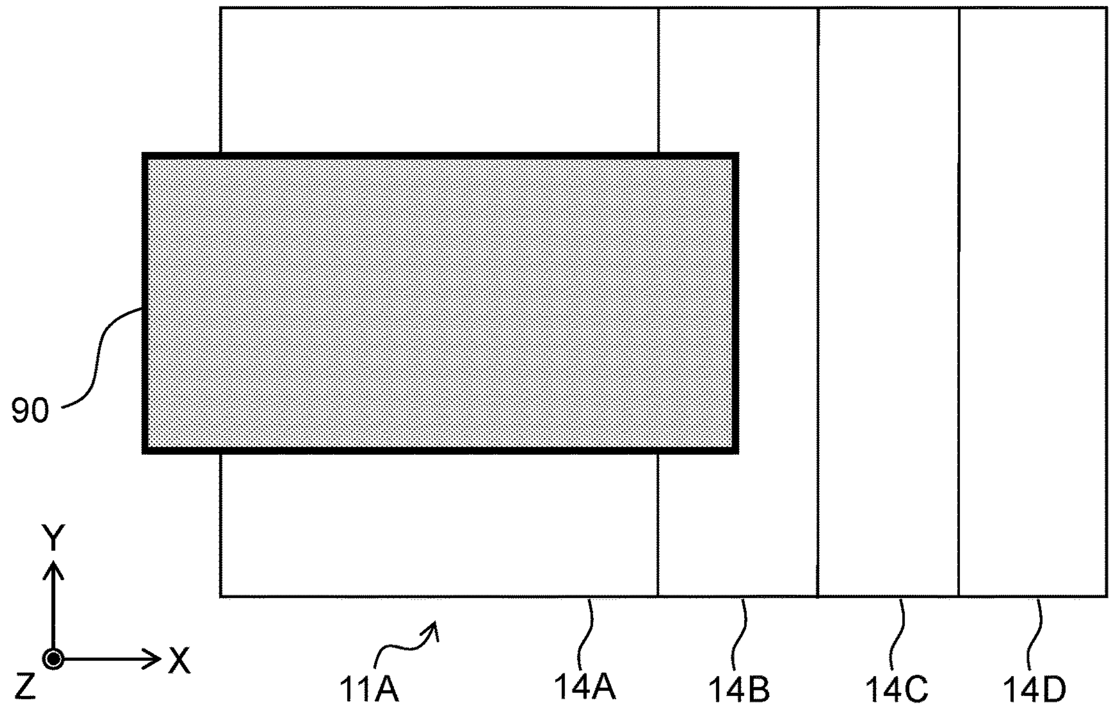
FIG. 4 is a schematic plan view illustrating the position of a heating target over the first electrode according to the first exemplary embodiment.

FIG. 4 is a schematic plan view illustrating a positional relation of heating target 90 and first electrode 11A when viewed downward from above along the Z-axis, in the case where a frozen meat block is heated in heating course B. The frozen meat blocks shown in FIGS. 3 and 4 each have dimensions of 200 mm width 100 mm depth×100 mm height. Heating course B is also one of the heating courses in the normal mode.

First, a user places heating target 90 on a dedicated heating tray, and then mounts the heating tray over the second electrode. The user operates a power switch disposed in operation part 50 to turn on the power of high-frequency heating device 1A.

The user presses a button disposed in operation part 50 to select a heating course to be performed in high-frequency heating device 1A. The heating course includes a heating course in the normal mode and a heating course in the protection mode. That is, the user inputs the selection of either the normal mode or the selection of the protection mode, via operation part 50. Then, the user presses a start button disposed in operation part 50 to start heating.

FIG. 5 is a table of heating courses selectable in the first embodiment and operations, in each heating course, of high-frequency heating device 1A. As shown in FIG. 5, in heating courses A and B, heating target 90 is assumed to be a frozen meat block measuring 200 mm width×100 mm depth×100 mm height. In heating courses C and D, heating target 90 is assumed to be a frozen raw-fish fillet measuring 150 mm width×50 mm depth×30 mm height.

The operations of high-frequency heating device 1A in the case where heating course A in the normal mode is selected will be described. Before causing high-frequency heating device 11A to start operating, the user mounts a heating tray with a thickness of 20 mm over the second electrode, with the frozen meat block, i.e., heating target 90 being placed on a center portion of the heating tray. The thickness of the heating tray is 20 mm and the distance between heating target 90 and the second electrode is 20 mm.

Upon pressing of the button to select heating course A, controller 60 causes position adjusting part 20 to move first electrode 11A such that the distance between first electrode 11A and second electrode 12 is 140 mm. The height of heating target 90 is 100 mm and the thickness of the heating tray is 20 mm; therefore, the distance between heating target 90 and first electrode 11A is 20 mm.

After that, controller 60 causes high-frequency power supply 30 to output high-frequency electric power of 500 W for 10 minutes to supply the power to all split electrodes 14A to 14D of first electrode 11A as a region to which the power is supplied. After 10 minutes, controller 60 notifies the user of the completion of the heating by voice and display, and terminates the heating.

After the completion of predetermined heating, the user may operate operation part 50 to additionally continue heating target 90 in accordance with the degree to which the object has been heated. Through use of additional-heating keys disposed in operation part 50, the user may set the heating power output, the distance between the electrodes, and the region to which first electrode 11A supplies the high-frequency electric power.

Next, the operations of high-frequency heating device 1A in the case where heating course B in the protection mode is selected will be described. Differences between heating course A and heating course B lie in the placing position of heating target 90 on a dedicated tray, the region to which first electrode 11A supplies high-frequency electric power, the distance between the electrodes, the heating power output, and the heating time. The user places heating target 90 on a portion of the dedicated tray, with the portion being on the left end in the width direction, i.e., left-and-right direction and at the center in the depth direction.

As shown in FIG. 5, in heating course B, controller 60 supplies high-frequency electric power only to split electrode 14A among split electrodes 14A to 14D. As a result, the region to which first electrode 11A supplies the high-frequency electric power is of 150 mm×200 mm, being smaller than the region in the case of heating course A.

In this case, as shown in FIG. 4, the most part of heating target 90 is located under split electrode 14A. However, portions up to 25 mm inside from both ends of heating target 90 protrude along the X-axis from split electrode 14A to which the high-frequency electric power is supplied.

That is, in the protection mode, parts of heating target 90 is not placed under split electrode 14A, to which the high-frequency electric power is supplied, among split electrodes 14A to 14D. In a plan view, the length of split electrode 14A along the X-axis is smaller than the length of heating target 90 along the X-axis.

In a plan view, of the four sides of heating target 90, the two sides parallel to the Y-axis tend to be overheated. Fortunately, as described above, it is possible to prevent the overheating by placing the object such that its sides in question are located outside the area facing split electrode 14A, to which the high-frequency electric power is supplied.

That is, in the protection mode, controller 60 causes high-frequency power supply 30 to supply high-frequency electric power to split electrode 14A, among split electrodes 14A to 14D, that faces the part of heating target 90. On the other hand, controller 60 does not cause high-frequency power supply 30 to supply high-frequency electric power to split electrodes 14B to 14D, among split electrodes 14A to 14D, that face other part of heating target 90.

As shown in FIG. 5, the distance between first electrode 11A and second electrode 12 is 160 mm and the thickness of the heating tray is 20 mm the same as the thickness in the normal mode. Thus, the distance between heating target 90 and second electrode 12 is 20 mm. The distance between the electrodes is 160 mm, the height of heating target 90 is 100 mm, and the thickness of the heating tray is 20 mm, in which case the distance between heating target 90 and first electrode 11A is 40 mm.

In this state, the distance between heating target 90 and first electrode 11A is 20 mm larger than the distance in the normal mode. Therefore, the electric field is strong in the vicinities of edges of first electrode 11A to which high-frequency electric power is supplied. However, since the distance described above is larger than in the normal mode, it allows a reduction in local overheating in the vicinities of the edges of first electrode 11A to which high-frequency electric power is supplied.

In the protection mode, the heating power output is set to 250 W which is lower than in the normal mode, and the heating time is set to 20 minutes which is longer than in the normal mode. In this way, in the protection mode, the high-frequency electric power, which is smaller heating power output than in the normal mode, is supplied for a longer period of time. That is, in the protection mode, the heating power output per unit time is smaller than in the normal mode, which allows more uniformed heating of heating target 90 than in the normal mode.

Generally, heating power output of 250 W means continuous outputting of high-frequency electric power of 250 W. However, it is also possible to provide the heating power output of 250 W by intermittently outputting high-frequency electric power larger than 250 W to have a time average of 250 W.

Figure 8:
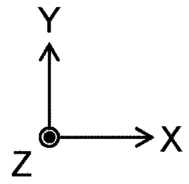
FIG. 8 is a diagram illustrating temperature distributions of heating targets having been thawed in heating courses A to D.

Next, effects of the heating of heating target 90 will be described for cases in the normal mode (heating courses A and C) and in the protection mode (heating courses B and D). FIG. 8 illustrates temperature distributions (in the XY plane) of heating targets 90 when viewed from above, in the cases where heating targets 90, being frozen products, are thawed in heating courses A to D. The temperatures (in ° C.) described in the figure are temperatures at central portions of heating targets 90 in the up-and-down direction.

Temperature distribution (a) shown in FIG. 8 is the temperature distribution of a frozen meat in the case of having been thawed in heating course A for heating the whole of heating target 90. Heating course A is in the normal mode. In heating course A, the frozen meat of 200 mm width×100 mm depth×100 mm height is thawed.

Temperature distribution (b) shown in FIG. 8 is the temperature distribution of a frozen meat in the case of having been thawed in heating course B for partially heating heating target 90. Heating course B is also in the normal mode. The frozen meat has the same dimensions as in the case of heating course A. Temperature distribution (c) shown in FIG. 8 is the temperature distribution of a frozen raw-fish fillet having a temperature of −20° C. and dimensions of 150 mm width×50 mm depth×30 mm height in the case of having been thawed in heating course C in the normal mode.

Temperature distribution (d) shown in FIG. 8 is the temperature distribution in a case of a frozen raw-fish fillet after having been thawed in heating course D in the protection mode, with the frozen fillet having an initial temperature (−60° C.) lower than that of usual frozen products and having the dimensions the same as those of usual frozen products. Temperature distribution (e) shown in FIG. 8 is the temperature distribution in a case of a frozen raw-fish fillet after having been thawed in heating course C, with the frozen fillet initially having a temperature of −60° C. and dimensions of 150 mm width×50 mm depth×30 mm height. Temperature distribution (e) shown in FIG. 8 is a comparative example in comparison with temperature distribution (d) shown in FIG. 8.

As shown in temperature distribution (a) of FIG. 8, the frozen meat having been thawed in heating course A is such that the temperatures at four corners are higher compared to those at the other portions and that the temperature at the center portion is lower compared to those at the other portions. In this case, the frozen meat has been heated but still yet to change its color, remaining in a state of being cuttable with a kitchen knife. That is, the frozen meat has been thawed to the extent to which it is ready for cooking soon.

As shown in temperature distribution (b) of FIG. 8, the frozen meat having been thawed in heating course B is such that it has been heated to have temperatures almost uniform over the whole thereof, being in a state of being easily cuttable with a kitchen knife. The heating takes longer time in heating course B than in heating course A; however, heating course B allows the uniform thawing of the whole of heating target 90 while preventing temperature rises at four corners. A user can select, depending on purpose, a heating course to be used among these courses.

As illustrated in temperature distributions (c) and (d) of FIG. 8, both the frozen raw-fish fillets having been thawed in heating courses C and D have almost uniform temperatures and are in a state of being cuttable with a kitchen knife immediately.

In contrast, as illustrated in temperature distribution (e) of FIG. 8, in the case where the frozen raw-fish fillet with the temperature of −60° C. has been thawed in heating course C, the temperatures at four corners has risen considerably but the temperatures at inside portions remain low. That is, the frozen raw-fish fillet in this case is so hard that it is difficult to cut with a kitchen knife.

Upon stored at room temperature or stored in a refrigerator, a frozen raw-fish fillet is thawed in such a manner that its temperature slowly passes through a temperature zone that is called the maximum ice crystal formation zone. As a result, dripping from the frozen raw-fish fillet tends to occur, which possibly impairs the fillet's commercial value. The maximum ice crystal formation zone is a temperature zone in which ice crystals tend to grow larger in the process of freezing a food, and commonly refers to a temperature zone of −1° C. to −5° C. in which food begins to freeze.

In addition, temperature differences between the inner and outer portions are so large that it takes long time to thaw the whole of the fillet. In this way, in the case of a frozen product having low initial temperatures, since the product tends to have large temperature differences particularly between its four corners and center, heating it in the protection mode which can prevent overheating of the four corners is effective.

A position for placing heating target 90 may be indicated on the heating tray. Depending on the size of heating target 90, the region of first electrode 11A that receives supplied high-frequency electric power is changed. The indication of the position for placing heating target 90 on the heating tray allows a user to easily place heating target 90 at the proper position.

A heating tray having a thickness depending on each heating course may be provided. In order to make the distance between the heating tray and second electrode 12 equal to a desired distance, a guide to help place the tray may be disposed on a side wall inside heating chamber 13. This allows proper adjustment of the distance between the second electrode 12 and heating target 90, resulting in more uniformed hating of heating target 90.

In the first embodiment, high-frequency heating device 1A has the four heating courses. However, the number of its heating courses is not limited to this.

To add a heating course requested by a user, controller 60 may read the heating course from a storage medium such as a flash memory card. Controller 60 may download the heating course via the Internet.

The operation part is not limited to the buttons. The operation part may include a liquid crystal touch panel. A smartphone or the like may be used as an operation part. High-frequency heating device 1A may be manipulated by voice via a smartphone or the like.

Second Exemplary Embodiment

High-frequency heating device 1B according to a second exemplary embodiment of the present disclosure will be described. In the second exemplary embodiment, the descriptions will focus on its differences from the first exemplary embodiment. In the second exemplary embodiment, the same or equivalent constituent elements as those of the first exemplary embodiment are designated by the same numerals and symbols, and their duplicate explanations are omitted.

Figure 9:
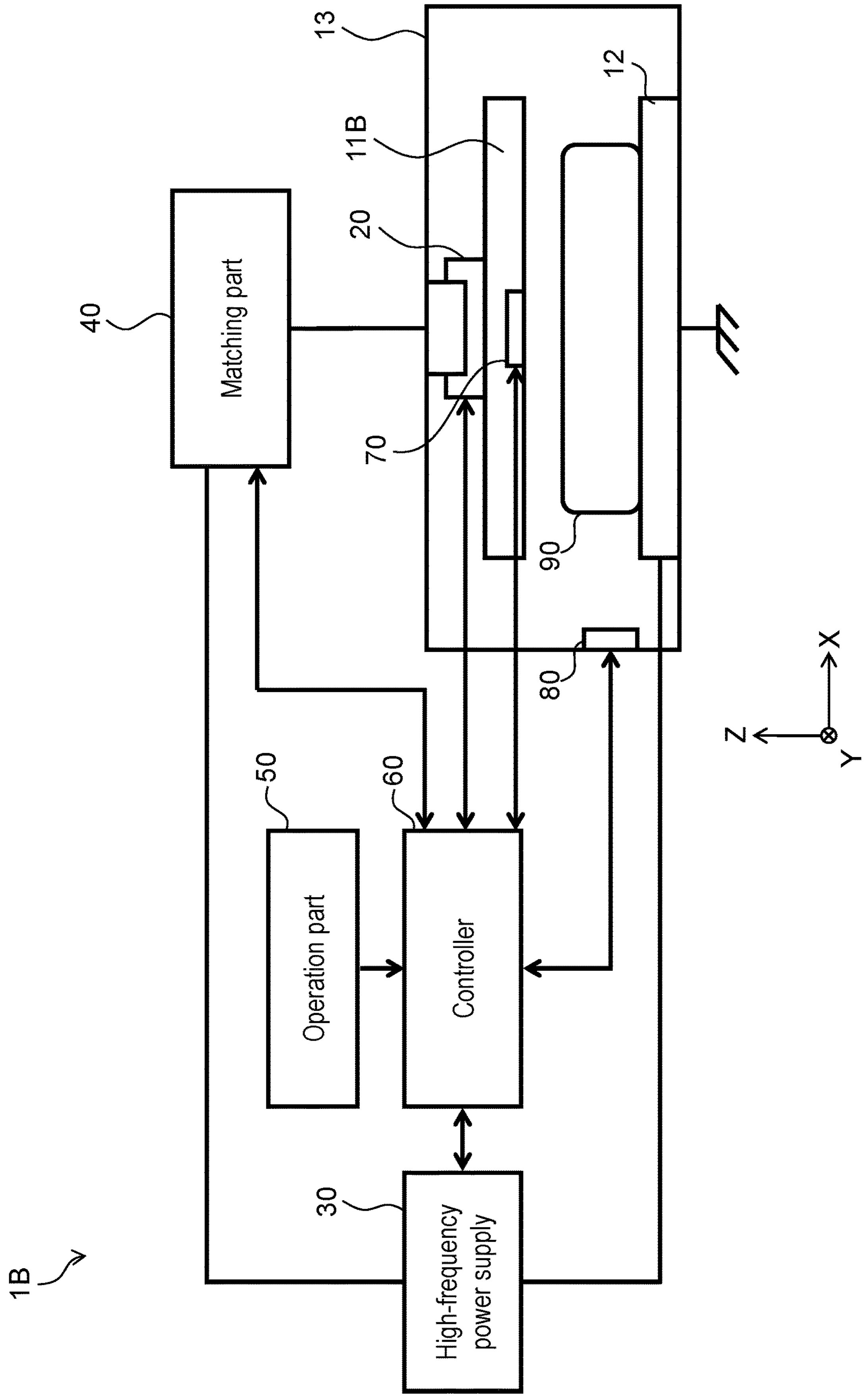
FIG. 9 is a schematic diagram illustrating a configuration of a high-frequency heating device according to a second exemplary embodiment of the present disclosure.

FIG. 9 is a schematic block diagram illustrating a configuration of high-frequency heating device 1B according to the second embodiment. As shown in FIG. 9, high-frequency heating device 1B includes temperature detecting part 70 and height detecting part 80. Controller 60 controls position adjusting part 20 and high-frequency power supply 30, in accordance with information detected by temperature detecting part 70 and height detecting part 80.

High-frequency heating device 1B includes first electrode 11B, instead of first electrode 11A, that is coupled to high-frequency power supply 30 via matching part 40. As in the case of first electrode 11A, first electrode 11B is a plate-like electrode disposed inside heating chamber 13, with the electrode being parallel to the XY plane and facing second electrode 12. High-frequency power supply 30 applies high-frequency electric power between first electrode 11B and second electrode 12.

Figure 10:
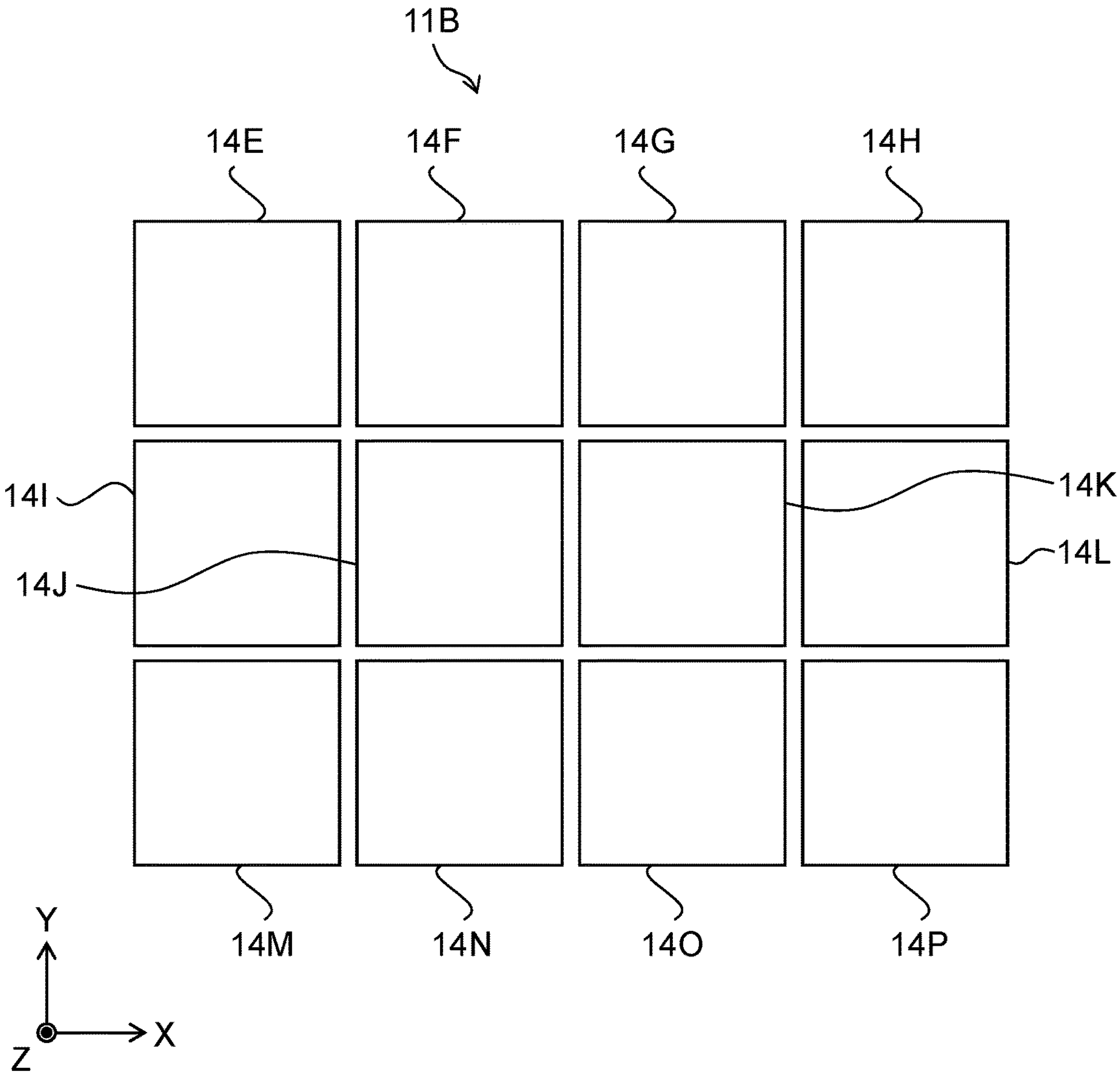
FIG. 10 is a schematic plan view of a first electrode according to the second exemplary embodiment.

FIG. 10 is a schematic diagram illustrating a configuration of first electrode 11B in a plan view, i.e., when viewed downward from above along the Z-axis. As shown in FIG. 10, first electrode 11B includes a plurality of plate-like electrodes disposed in a lattice.

Specifically, first electrode 11B includes twelve electrodes (split electrodes 14E to 14P) disposed in 3 rows×4 columns. Each split electrode is formed in a square shape with each side of 5 cm. Split electrode 14E is disposed at the left end in the deepmost row. In this column, split electrode 14F, split electrode 14G, and split electrode 14H are disposed in order on the right side of split electrode 14E.

Split electrode 14I is disposed at the left end in the center row. In this row, split electrode 14J, split electrode 14K, and split electrode 14L are disposed in order on the right side of split electrode 14I. Split electrode 14M is disposed at the left end in the nearest row. In this column, split electrode 14N, split electrode 14O, and split electrode 14P are disposed in order on the right side of split electrode 14M.

The number and disposition of the split electrodes are not limited to this. Sixteen split electrodes may be disposed in a lattice of 4 rows×4 columns. A plurality of split electrodes may be disposed radially. The shape of each of split electrodes 14E to 14P is not limited to the square. Split electrodes 14E to 14P may each have a rectangular shape, a round shape including an elliptical one, or a polygonal shape other than a quadrilateral one.

Temperature detecting part 70 is disposed at a center portion of first electrode 11B. Temperature detecting part 70 includes a plurality of infrared sensors, thereby measuring temperatures over the whole of upper surface of heating target 90. In cases where detected temperatures are greatly different from the temperature of heating chamber 13, controller 60 may also detect the size of heating target 90 from the information from temperature detecting part 70.

In the second embodiment, controller 60 performs heating in the normal mode in the case of heating target 90 with a temperature of −20° C. or higher, and heating in the protection mode in the case of heating target 90 with a temperature of lower than −20° C. With this configuration, even in the case of heating target 90 being a frozen product with especially low temperatures, the heating in the protection mode can prevent local overheating, thereby allowing uniform heating over the whole of the object.

Temperature detecting part 70 may include a plurality of infrared sensors disposed in a line. For example, in the case where a plurality of infrared sensors is disposed in a line along the X-axis, reciprocating of temperature detecting part 70 with the X-axis as a center axis allows the measurement of temperatures over the whole of heating target 90. To measure the temperatures over the whole of heating target 90 at once, temperature detecting part 70 may include a plurality of infrared sensors disposed in a lattice.

Height detecting part 80 is disposed on a side wall of heating chamber 13. Height detecting part 80 is a camera that takes an image of heating target 90 along the X-axis or Y-axis. Controller 60 calculates the height of heating target 90 from the taken image. Note that the height of heating target 90 is the dimension of heating target 90 along the Z-axis.

In the case where the height of heating target 90 is 60 mm or higher, controller 60 causes position adjusting part 20 to adjust the distance between heating target 90 and first electrode 11B to 40 mm. In the case where the height of heating target 90 is 30 mm or higher and lower than 60 mm, controller 60 causes position adjusting part 20 to adjust the distance between heating target 90 and first electrode 11B to 30 mm. In the case where the height of heating target 90 is lower than 30 mm, controller 60 causes position adjusting part 20 to adjust the distance between heating target 90 and first electrode 11B to 20 mm.

Height detecting part 80 may be a phototube or the like other than the camera. A user may input the height of heating target 90 via operation part 50.

Controller 60 may detect the dimensions (width, depth, and height) of heating target 90 from a taken image. The user may input the dimensions (width, depth, and height) of heating target 90 via operation part 50. Based on the dimensions (width, depth, and height) of heating target 90, controller 60 can determine to which split electrodes (among split electrodes 14E to 14P) of first electrode 11B the high-frequency electric power is supplied in the protection mode.

In this way, controller 60 detects the dimensions (width, depth, and height) of heating target 90 from the taken image of heating target 90. In accordance with the dimensions of heating target 90, controller 60 determines to which split electrodes the high-frequency electric power is supplied. That is, controller 60 sets the region of the electrodes, the region to which the high-frequency electric power is supplied.

Figure 11:
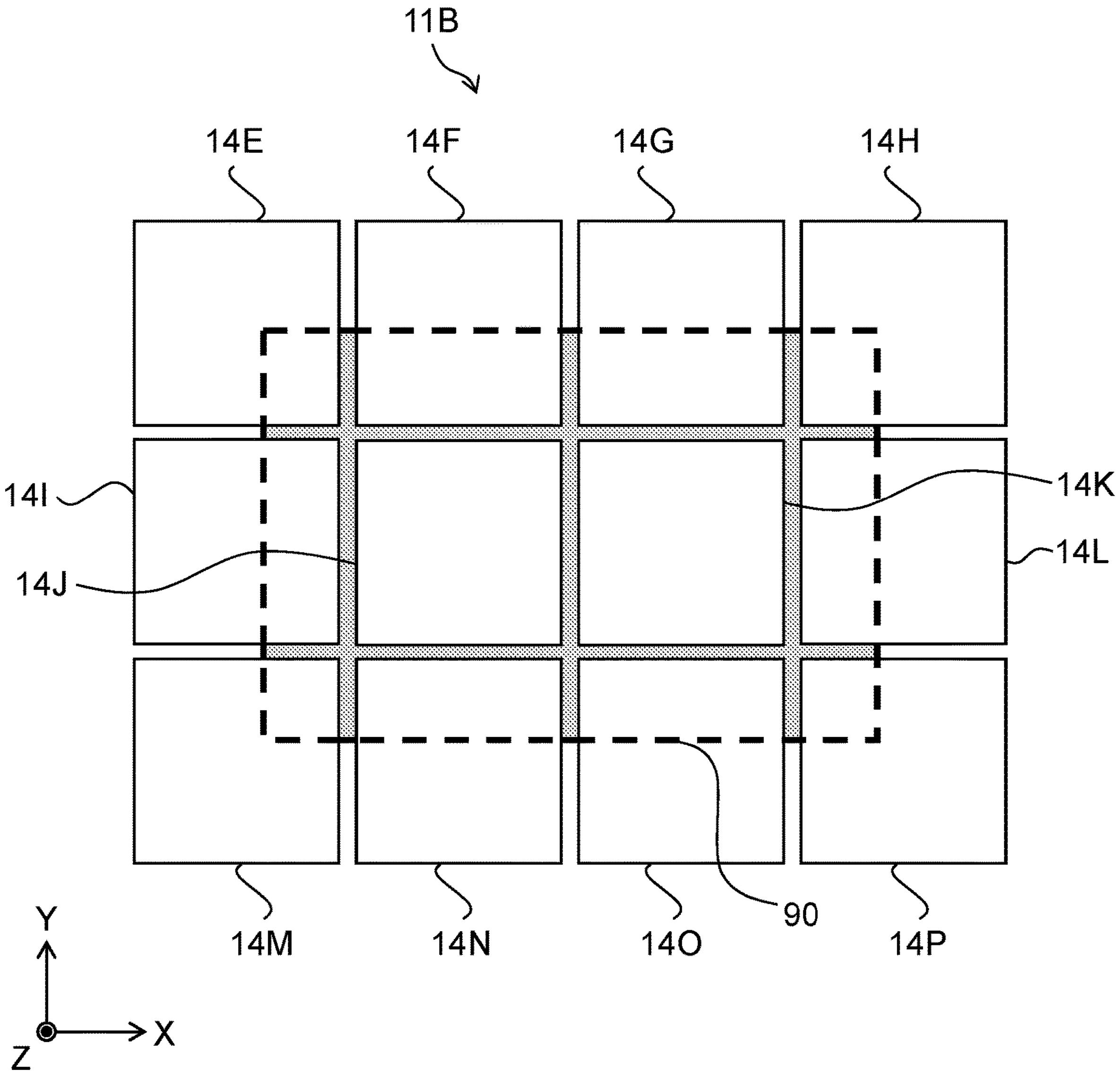
FIG. 11 is a schematic plan view illustrating a position of a heating target over the first electrode according to the second exemplary embodiment.

Descriptions will be made regarding operations and actions, in the protection mode and normal mode, of the high-frequency heating device configured as described above. FIG. 11 is a schematic plan view illustrating a positional relation of heating target 90 and first electrode 11B when viewed downward from above along the Z-axis.

FIG. 12 is a table of heating courses selectable in the second embodiment and operations in each heating course of the high-frequency heating device. Controller 60 determines a heating course in accordance with the temperature and height of heating target 90. Heating target 90 is a frozen raw-fish fillet measuring 150 mm width×100 mm depth.

Here, the temperature of operating environment of high-frequency heating device 1B is assumed to be 20° C., and heating target 90 is assumed to be a frozen product. Controller 60 determines the dimensions of width and depth of heating target 90 based on the region of negative temperatures detected by temperature detecting part 70.

As shown in FIG. 12, for heating targets 90 having the same width and depth, controller 60 determines heating conditions in accordance with the temperatures and heights of heating targets 90. In the case of heating target 90 having a temperature of −20° C. or higher and a height of lower than 30 mm, controller 60 determines heating conditions that include the normal mode, all split electrodes, a high heating power output (1000 W), and a short period (5 minutes).

In the case of heating target 90 having a height of 30 mm or higher, controller 60 sets the heating mode to the protection mode. In the protection mode, the region, of first electrode 11B, to which high-frequency electric power is supplied is smaller than in the normal mode. Moreover, the region is smaller in size than heating target 90.

In the protection mode, as shown in FIG. 12, the high-frequency electric power is supplied to split electrodes 14J and 14K (100 mm width×50 mm depth). As described above, heating target 90 has the dimensions of 150 mm width×100 mm depth. Therefore, when heating target 90 is placed at the center of first electrode 11B, as shown in FIG. 11, the edges of heating target 90 in the width and depth directions are each placed 25 mm out of split electrodes 14J and 14K.

In the protection mode, as the height of heating target 90 is higher, controller 60 sets first electrode 11B to be farther away from second electrode 12, sets the heating power output to be lower, and sets the heating time to be longer, in comparison to those in the normal mode. In a plan view, the heating target's sides perpendicular to first electrode 11B tend to be overheated. Fortunately, by controlling the setting of the interelectrode distance, heating power output, and heating time as described above, it is possible to uniformly heat heating target 90 while preventing the overheating.

Such temperatures of lower than −20° C. are low relative to temperatures inside typical freezers. In the case of the temperature of heating target 90 being lower than −20° C., the heating mode is set as follows. For heating target 90 with a height lower than 20 mm, the mode is set to the normal mode. For heating target 90 with a height 20 mm or higher, the mode is set to the protection mode.

That is, in the case of the temperature of heating target 90 being lower than −20° C., the heating mode is more likely set to the protection mode compared to the case of the temperature of heating target 90 being −20° C. or higher. In addition, compared to the case of the temperature of heating target 90 being −20° C. or higher, the distance between first electrode 11B and heating target 90 is set to be larger and the heating power output is set to be lower. This allows unform heating or thawing regardless of the temperature of heating target 90.

The electric field is weaker outside the heating region of first electrode 11B than inside the heating region of first electrode 11B. Therefore, in the protection mode, peripheral portions of heating target 90 are often less sufficiently heated than a center portion of heating target 90.

To solve this, after the completion of the heating by the split electrodes in contact with the center portion of heating target 90, additional heating may be performed with split electrodes in contact with the peripheral portions of heating target 90. As shown in FIG. 11, the center portion of heating target 90 is heated with split electrodes 14J and 14K. The peripheral portions of heating target 90 are heated with split electrodes 14E, 14F, 14G, 14H, 14I, 14L, 14M, 14N, 14O, and 14P.

In this way, in order to prevent the overheating of the peripheral portions of heating target 90, after having heated the center portion of heating target 90, it is possible to heat the peripheral portions of heating target 90 as in the case of the center portion.

That is, in the protection mode, controller 60 causes high-frequency power supply 30 to supply high-frequency electric power to split electrodes that face part of heating target 90. On the other hand, controller 60 does not cause the high-frequency power supply to supply high-frequency electric power to split electrodes that face other part of heating target 90.

Subsequently, controller 60 does not cause high-frequency power supply 30 to supply high-frequency electric power to the split electrodes that face the part of heating target 90. On the other hand, controller 60 causes the high-frequency power supply to supply high-frequency electric power to the split electrodes that face the other part of heating target 90.

Here, the split electrodes that face the part of heating target 90 are split electrodes 14J and 14K. The split electrodes that face the other part of heating target 90 are split electrodes 14E, 14F, 14G, 14H, 14I, 14L, 14M, 14N, 14O, and 14P.

During heating in the normal mode or the protection mode, when temperature detecting part 70 detects that the temperature of heating target 90 partially reaches a predetermined value, controller 60 may cause the heating power output to be reduced. Alternatively, controller 60 may cause the heating to be halted for a certain period. This operation may be applied to either only some split electrodes that correspond to temperature-risen portions of heating target 90 or all split electrodes. This results in the prevention of partial overheating, thereby allowing uniform heating over the whole of heating target 90.

Note that, in the second embodiment, high-frequency power supply 30 supplies high-frequency electric power to both first electrode 11B and second electrode 12. However, high-frequency power supply 30 may supply high-frequency electric power only to first electrode 11B, with second electrode 12 being grounded. Conversely, high-frequency power supply 30 may supply high-frequency electric power only to second electrode 12, with first electrode 11B being grounded.

That is, high-frequency power supply 30 may supply high-frequency electric power to any one or both of first electrode 11B and second electrode 12.

INDUSTRIAL APPLICABILITY

As described above, the high-frequency heating devices according to the present disclosure, with simple configurations, are capable of uniformly heating targets with any shape. The high-frequency heating devices according to the present disclosure are applicable to, for example, cooking home-appliances such as a thawing machine and a heating cooker, or drying apparatus for such as food materials or wood.

REFERENCE MARKS IN THE DRAWINGS

1A, 1B high-frequency heating device
11A, 11B, first electrode
12 second electrode
13 heating chamber
14A, 14B, 14C, 14D, 14E, 14F, 14G, 14H, 14I, 14J, 14K, 14L, 14M, 14N, 14O, 14P split electrode
20 position adjusting part
30 high-frequency power supply
31 high-frequency oscillator
32, 33 amplifier
40 matching part
50 operation part
60 controller
70 temperature detecting part
80 height detecting part
90 heating target

The invention claimed is:

1. A high-frequency heating device, comprising:
a heating chamber;
a first electrode disposed inside the heating chamber;

a second electrode disposed inside the heating chamber and facing the first electrode;

a high-frequency power supply configured to generate high-frequency electric power; and a controller configured to control the high-frequency power supply, wherein the controller is configured to control heating of a heating target placed between the first electrode and the second electrode by causing the high-frequency power supply to apply the high-frequency electric power between the first electrode and the second electrode, wherein the controller causes the high-frequency power supply to selectively perform the heating in a normal mode and the heating in a protection mode, the normal mode being for heating a whole of the heating target, the protection mode being for heating the heating target while preventing local overheating of the heating target, and wherein, in the protection mode, the controller causes the high-frequency power supply to generate the high-frequency electric power at a smaller heating power output per unit time than the high-frequency electric power generated in the normal mode.

2. The high-frequency heating device according to claim 1, wherein the first electrode includes a plurality of split electrodes, and wherein, in the protection mode, the controller causes the high-frequency power supply to supply the high-frequency electric power to first split electrodes, of the plurality of split electrodes, facing a first part of the heating target, and does not cause the high-frequency power supply to supply the high-frequency electric power to second split electrodes, of the plurality of split electrodes, facing a second part of the heating target, the second part of the heating target being different from the first part of the heating target.

3. The high-frequency heating device according to claim 2, wherein, in the protection mode, the controller causes the high-frequency power supply to supply the high-frequency electric power to the first split electrodes facing the first part of the heating target and does not cause the high-frequency power supply to supply the high-frequency electric power to the second split electrodes facing the second part of the heating target, and the controller, subsequently, does not cause the high-frequency power supply to supply the high-frequency electric power to the first split electrodes facing the first part of the heating target and causes the high-frequency power supply to supply the high-frequency electric power to the second split electrodes facing the second part of the heating target.

4. The high-frequency heating device according to claim 1, further comprising:

a position adjusting part configured to adjust a distance between the first electrode and the second electrode.

5. The high-frequency heating device according to claim 4, wherein, in the protection mode, the position adjusting part causes the first electrode to be positioned farther away from the heating target as compared to a position of the first electrode relative to the heating target in the normal mode.

6. The high-frequency heating device according to claim 1, further comprising:

a camera disposed inside the heating chamber and configured to take an image of the heating target, wherein the controller detects a dimension of the heating target from the image of the heating target, the image being taken by the camera.

7. The high-frequency heating device according to claim 1, further comprising:

a temperature detecting part configured to detect a temperature of the heating target.

8. The high-frequency heating device according to claim 1, further comprising:

an operation part configured to input a selection, by a user, of either the normal mode or a selection of the protection mode.

9. A high-frequency heating device, comprising:

a heating chamber;

a first electrode disposed inside the heating chamber;

a second electrode disposed inside the heating chamber and facing the first electrode;

a position adjusting part configured to adjust a distance between the first electrode and the second electrode;

a high-frequency power supply configured to generate high-frequency electric power; and a controller configured to control the high-frequency power supply, wherein the controller is configured to control heating of a heating target placed between the first electrode and the second electrode by causing the high-frequency power supply to apply the high-frequency electric power between the first electrode and the second electrode, wherein the controller causes the high-frequency power supply to selectively perform the heating in a normal mode and the heating in a protection mode, the normal mode being for heating a whole of the heating target, the protection mode being for heating the heating target while preventing local overheating of the heating target, and wherein, in the protection mode, the position adjusting part causes the first electrode to be positioned farther away from the heating target as compared to a position of the first electrode relative to the heating target in the normal mode.

10. The high-frequency heating device according to claim 9, wherein the first electrode includes a plurality of split electrodes, and wherein, in the protection mode, the controller causes the high-frequency power supply to supply the high-frequency electric power to first split electrodes, of the plurality of split electrodes, facing a first part of the heating target, and does not cause the high-frequency power supply to supply the high-frequency electric power to second split electrodes, of the plurality of split electrodes, facing a second part of the heating target, the second part of the heating target being different from the first part of the heating target.

11. The high-frequency heating device according to claim 10, wherein, in the protection mode, the controller causes the high-frequency power supply to supply the high-frequency electric power to the first split electrodes facing the first part of the heating target and does not cause the high-frequency power supply to supply the high-frequency electric power to the second split electrodes facing the second part of the heating target, and the controller, subsequently, does not cause the high-frequency power supply to supply the high-frequency electric power to the first split electrodes facing the first part of the heating target and causes the high-frequency power supply to supply the high-frequency electric power to the second split electrodes facing the second part of the heating target.

12. The high-frequency heating device according to claim 9, further comprising:

a camera disposed inside the heating chamber and configured to take an image of the heating target, wherein the controller detects a dimension of the heating target from the image of the heating target, the image being taken by the camera.

13. The high-frequency heating device according to claim 9, further comprising:

a temperature detecting part configured to detect a temperature of the heating target.

14. The high-frequency heating device according to claim 9, further comprising:

an operation part configured to input a selection, by a user, of either the normal mode or a selection of the protection mode.

* * * * *